United States Patent Office 2,870,217
Patented Jan. 20, 1959

2,870,217

PROCESS FOR PRODUCING LOW MOLECULAR WEIGHT PROPYLENE POLYMERS

William G. Toland, Jr., San Rafael, Calif., assignor to California Research Corporation, San Francisco, Calif., a corporation of Delaware No Drawing. Application March 14, 1955
Serial No. 494,230

3 Claims. (Cl. 260—614)

The present invention relates to a process for the preparation of high octane motor fuel blends or components useful in such blends. More particularly, the invention is concerned with the preparation of high octane motor fuel compositions by a process which involves contacting propylene and/or a material capable of yielding propylene under reaction conditions at elevated temperatures and pressures with a dilute aqueous solution of a mineral acid catalyst.

In accordance with one aspect of the invention high octane motor fuel blends can be prepared, these blends comprising compounds of high octane value, including propylene dimers, such as 2-methyl-2-pentene, 4-methyl-2-pentene, and 2-methyl-2-pentene; trimers; isopropyl alcohol; and diisopropyl ether. Moreover, blends of these compositions can be prepared such as to contain the aforesaid components in varying proportions and predominating in one or more of the desired components. In another aspect of the invention, one or more of the materials produced in accordance with the invention can readily be isolated and employed in any desired manner, such as in the preparation of blends of desired composition.

Broadly, the process of the present invention involves contacting at elevated temperatures and pressures propylene and/or a material, e. g., isopropyl alcohol, which yields propylene under reaction conditions (hereinafter and in the claims included in the term "propylene"), with an aqueous solution of a mineral acid, e. g., sulfuric acid, having an acid concentration ranging from about 0.05 to 10 mol percent, preferably 1 to 5 mol percent.

More specifically, the process of the present invention comprises contacting propylene with an aqueous solution of a mineral acid having a concentration of 0.05 mol percent to 10 mol percent, water being present in an amount of 1 mol up to 3 mols and higher per mol of propylene, at a temperature ranging from about at least 400° F. to about 600° F., and under a pressure sufficient at the operating temperatures to maintain water in the liquid state during reaction, i. e., under a pressure between about 1000 and 3000 p. s. i. g. and higher, for a period of time sufficient to produce the desired composition, including propylene dimers and trimers, along with isopropyl alcohol and diisopropyl ether. Although molar ratios of water to propylene greater than 3:1, say, up to 100 can be employed, it has been determined that the use of over 3:1 molar ratios of water to propylene has little effect in increasing the degree of conversion at equilibrium.

The process of the invention may be carried out batchwise, continuously, semi-continuously or by a combination of suitable methods. In batch operation, for example, propylene may be contacted with the dilute aqueous acid solution in a closed vessel and subjected to reaction conditions of temperature and pressure. Following reaction generally of one to two hours' duration, the contents of the vessel are withdrawn, the organic and aqueous phases separated and distilled.

In continuous operation propylene feed can be fed into the base of a packed or unpacked tower containing the dilute aqueous acid catalyst, sufficient agitation being provided so as to insure contact of the propylene with the catalyst. When proceeding in this fashion a top organic phase and a bottom aqueous phase are formed. In the organic phase will be found a mixture comprising dimer, trimer, diisopropyl ether and some isopropyl alcohol. A large portion of the isopropyl alcohol, together with some diisopropyl ether will be contained in equilibrium concentration in the bottom aqueous phase. The top organic phase is withdrawn, unconverted gaseous propylene flashed and the propylene recycled. The so treated organic layer can be used as such as a superior motor fuel blend, or modified as by distillation and recycling of certain of the components to obtain the desired fraction. In the event it should be desired to enrich the organic mixture with one or more of the components, for example, if more dimer is desired, isopropyl alcohol and diisopropyl ether are recycled to the reaction zone whereby they are converted to the dimer. If additional trimer is desired, the dimer fraction of the organic layer can be recycled whereby more trimer is formed. Isopropyl alcohol can be separated from the aqueous phase by fractional distillation, used for blending purposes or recycled to form more dimer and trimer.

It is preferred to run continuously under conditions which result in the production of dimer at the greatest space rate. Reaction times or contact times are often considerably shorter than the time required to establish equilibrium, because the rate of reaction is greatest at the start, resulting in faster dimer production during this initial period.

Continuous operation may be carried out at a space rate, volume of liquid dimer produced per volume of reactor per hour, of 0.1 to 1.0 at a contact time of the order of three minutes.

In general the reaction time required to produce a given conversion to dimer will depend on such factors as the concentration of reactants, catalyst, and temperature. It has been found that the rate of conversion to dimer is most rapid at the start of reaction, and at higher temperatures and concentrations of acid and propylene. However, acid concentrations above about 10%, especially in the upper temperature ranges, result in excessive darkening of the products and decomposition of products and catalyst, the catalyst, for example, producing sulfur dioxide.

The preferred acid catalyst is sulfuric. Hydrochloric acid, as well as phosphoric acid can be employed. With phosphoric acid operation at the higher regions of the concentration range specified and/or for longer periods of time will give the best results.

The following examples are given to illustrate the practice of the invention:

Example 1

A stainless steel shaking autoclave, equipped with an electrically heated jacket, bursting disc, pressure gage, thermowell and bleed valve was charged with 450 cc. of water, 2.8 cc. of 96% sulfuric acid and 610 cc. of isopropyl alcohol. This represents a molar ratio of water to catalyst to isopropyl alcohol of 25:0.05:8, and a concentration of acid in water of 0.2 mol percent. The autoclave was heated for 150 minutes at a temperature of 500° F., the initial pressure being 1825 p. s. i. g., after which time the pressure was determined to be 1700 p. s. i. g. and the reaction considered to have reached equilibrium. The bomb was allowed to cool at room temperature, and propylene bled off through a wet test meter. The remaining contents of the bomb were poured off, and the organic and aqueous phases separated and distilled.

The following products were obtained:

| Product | Amounts, g. | Yield on $C_3$, Mol Percent |
|---|---|---|
| Propylene | 166.6 | |
| Dimer | 49.9 | 29.5 |
| Trimer | 15.9 | 9.4 |
| Bottoms | 3.7 | 2.5 |
| Isopropyl alcohol | 74.5 | 30.8 |
| Diisopropyl ether | 16.7 | 7.7 |
| Total | | 79.9 |

Example 2

The same equipment was employed as in Example 1, and the products worked up in similar fashion, the materials and conditions being as follows: 900 cc. of water, 5.6 cc. of 96% sulfuric acid and 322 cc. of propylene were charged to the autoclave, representing a mol ratio of water to catalyst to propylene of 50:1.1:4, and a catalyst concentration in water of 0.2 mol percent. The temperature was 600° F.; pressure, 2275 p. s. i. g.; and reaction time, 150 minutes. The following products were obtained:

| Product | Amounts, g. | Yields on $C_3$, Mol Percent |
|---|---|---|
| Propylene | 70.6 | |
| Dimer | 21.0 | 21.5 |
| Trimer | 18.2 | 18.7 |
| Bottoms | 8.5 | 8.7 |
| Isopropyl alcohol | } 36.9 | 27.0 |
| Diisopropyl ether | | |
| Total | | 75.9 |

Example 3

The same conditions were followed as in Example 2, except that the acid concentration was doubled; that is, 450 cc. of water were used instead of 900 cc., the mol ratio of water to catalyst to propylene thus being 25:0.1:4, the acid concentration in water being 0.4 mol percent. There were obtained:

| Products | Amounts, g. |
|---|---|
| Propylene | 84.0 |
| Dimer | 12.0 |
| Trimer | 12.2 |
| Bottoms | 7.3 |
| Isopropyl Alcohol | } 43.4 |
| Diisopropyl ether | |

Example 4

The conditions of Example 1 were followed except that no catalyst was employed in this run. There was only obtained 9.9 g. of isopropyl alcohol and diisopropyl ether. This run shows that the catalyst is necessary.

Example 5

Example 2 was repeated, except that the reaction temperature was maintained at 500° F., instead of 600° F. The following products were obtained:

| Products | Amounts, g. |
|---|---|
| Propylene | 62.0 |
| Dimer | 20.1 |
| Trimer | 13.4 |
| Bottoms | 4.0 |
| Isopropyl alcohol | } 54.2 |
| Diisopropyl ether | |

This example shows that lower reaction temperatures reduce polymer formation and increase alcohol and ether formation. Indeed, temperatures below 400° F. have been found to yield substantially no polymers.

Example 6

Example 1 was repeated employing 610 g. of isopropyl alcohol and 8.5 cc. of 37% hydrochloric acid, the mol ratio of water to catalyst to alcohol being 25:0.1:8, representing a catalyst concentration in water of 0.4. The following products were obtained:

| Products | Amount, g. | Yield on alcohol, mol percent |
|---|---|---|
| Propylene | 202 | |
| Dimer | 31.8 | 22.3 |
| Trimer | 6.6 | 4.7 |
| Bottoms | 2.1 | 1.5 |
| Isopropyl alcohol | 85.8 | 41.8 |
| Diisopropyl ether | 12.2 | 7.1 |
| Total | | 77.4 |

Example 7

The equipment and procedure of Example 1 were employed with the following reactants and conditions: Charged to the autoclave were 450 cc. of water, 113 g. of phosphoric acid (86.6%) and 610 cc. of isopropyl alcohol. The amounts represent a mol ratio of water to catalyst to alcohol, of 25:1.0:8, the catalyst concentration in water, being 3.8%. The contents of the autoclave were heated at 500° F. for 150 minutes. The initial pressure was 1850 p. s. i. g. and at the end, 1400 p. s. i. g. The following products worked up as in Example 1 by distillation of the organic layer, were obtained in the stated amounts:

| Products | Amount, g. |
|---|---|
| Propylene | 205 |
| Dimer | 46.2 |
| Trimer | 12.7 |
| Bottoms | 2.9 |
| Diisopropyl ether | 14.3 |

Example 8

Following the procedure of Example 1, there was employed 144 cc. of water, 2.8 cc. 96% $H_2SO_4$ 610 cc. isopropyl alcohol, representing a mol ratio of water to catalyst to isopropyl alcohol of 8:0.05:8, a temperature of 500° F. and a reaction time of 150 minutes. The following products were obtained, exclusive of the water layer:

| Products | Amounts, g. |
|---|---|
| Propylene | 208 |
| Dimer | 29.4 |
| Trimer | 6.2 |
| Bottoms | 4.0 |
| Diisopropyl ether | 22.0 |

It is apparent to those skilled in the art that a number of advantages flow from the practice of the invention. Thus the amount of acid required is a small percentage of that normally employed for these reactions. In accordance with the invention homogeneous-phase reaction is effected in aqueous solution without the side reactions normally encountered in concentrated acid. In addition, because of the limited solubility of the dimer and trimer polymers in the aqueous acid medium, controlled polymerization can be effected, the dimer and trimer being thrown out of solution before they are able to polymerize further.

Obviously many modifications and variations of the invention, as hereinbefore set forth, may be made without departing from the spirit and scope thereof and, therefore, only such limitations should be imposed as are indicated in the appended claims.

I claim:

1. In a process for producing propylene polymers by contacting propylene in a contacting zone at temperatures in the range 400° F. to 600° F. and pressures sufficient to maintain water in liquid phase with a catalyst consisting of a dilute aqueous solution of a mineral acid, the improvement which comprises producing selectively propylene dimer and trimer polymers by maintaining the concentration of said catalyst in said zone in the range of from about 0.05 mole percent to 10 mole percent based on the quantity of water present in said zone, maintaining at least one mole of water per mole of propylene in said zone, forming in said zone an organic phase comprising diisopropyl ether, isopropyl alcohol, and essentially only the dimer and trimer polymers of propylene, forming in said zone an aqueous phase comprising said catalyst isopropyl alcohol and diisopropyl ether, and recovering said organic phase.

2. Process as in claim 1, wherein the concentration of said catalyst in said zone is in the range from about 1 mole percent to 5 mole percent based on the quantity of water present in said zone.

3. In a process for producing propylene polymers by contacting propylene in a contacting zone at temperatures in the range of 400° F. to 600° F. and pressures sufficient to maintain water in liquid phase with a catalyst consisting of a dilute aqueous solution of a mineral acid, the improvement which comprises producing selectively propylene dimer and trimer polymers by maintaining the concentration of said catalyst in said zone in the range of from about 0.05 mole percent to 10 mole percent base on the quantity of water present in said zone, maintaining at least one mole of water per mole of propylene in said zone, forming in said zone an organic phase comprising diisopropyl ether, isopropyl alcohol, and essentially only the dimer and trimer polymers of propylene, forming in said zone an aqueous phase comprising said catalyst, isopropyl alcohol and diisopropyl ether, and recovering said polymers from said organic phase.

References Cited in the file of this patent

UNITED STATES PATENTS

| | | |
|---|---|---|
| Re. 21,314 | Francis | Jan. 9, 1940 |
| 2,148,288 | Bent | Feb. 21, 1939 |